United States Patent
Takeda et al.

(10) Patent No.: US 9,628,236 B2
(45) Date of Patent: Apr. 18, 2017

(54) BASE STATION APPARATUS, RADIO COMMUNICATION TERMINAL, RADIO COMMUNICATION SYSTEM AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Yoshihisa Kishiyama, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 16 days.

(21) Appl. No.: 14/399,971

(22) PCT Filed: Apr. 24, 2013

(86) PCT No.: PCT/JP2013/061983
§ 371 (c)(1),
(2) Date: Nov. 10, 2014

(87) PCT Pub. No.: WO2013/168562
PCT Pub. Date: Nov. 14, 2013

(65) Prior Publication Data
US 2015/0188684 A1    Jul. 2, 2015

(30) Foreign Application Priority Data
May 11, 2012 (JP) .................. 2012-109764

(51) Int. Cl.
*H04L 5/00* (2006.01)
*H04W 72/04* (2009.01)
*H04W 88/08* (2009.01)

(52) U.S. Cl.
CPC .......... *H04L 5/0053* (2013.01); *H04W 72/04* (2013.01); *H04W 72/0453* (2013.01); *H04W 88/08* (2013.01)

(58) Field of Classification Search
CPC .......... H04W 72/042; H04W 72/0453; H04W 72/1289
See application file for complete search history.

(56) References Cited

U.S. PATENT DOCUMENTS 8,542,697 B2   9/2013   Kim et al.
8,553,668 B2   10/2013  Roh et al.
(Continued)

FOREIGN PATENT DOCUMENTS

JP    2010-518734 A    5/2010

OTHER PUBLICATIONS

International Search Report for corresponding International Application No. PCT/JP2013/061983, mailed Jul. 9, 2013 (2 pages).
(Continued)

*Primary Examiner* — Pao Sinkantarakorn
(74) *Attorney, Agent, or Firm* — Osha Liang LLP

(57) ABSTRACT

The present invention is designed to provide a base station apparatus, a radio communication terminal, a radio communication system and a radio communication method which can reduce the cost required for MTC terminals when an LTE system is employed in the network domain of a machine communication system. A base station apparatus communicates with a first communication terminal in a first frequency band and also communicates with a second communication terminal in a second frequency band of a narrower bandwidth than the first frequency band, and includes: an allocation control section that allocates an extended downlink control channel which is frequency-division-multiplexed with a downlink shared data channel, in a predetermined frequency region in the second frequency band; and a mapping section that maps a common control signal
(Continued)

that is common between the second communication terminals at least, in a common search space of the extended downlink control channel.

11 Claims, 11 Drawing Sheets

(56) References Cited

U.S. PATENT DOCUMENTS

| | | | |
|---|---|---|---|
| 8,599,819 B2 | 12/2013 | Kim et al. | |
| 8,767,634 B2 | 7/2014 | Ahn et al. | |
| 2010/0195594 A1 | 8/2010 | Seo et al. | |
| 2013/0183987 A1* | 7/2013 | Vrzic | H04L 5/0053 455/450 |
| 2013/0194956 A1* | 8/2013 | Sartori | H04W 72/0406 370/252 |
| 2013/0242882 A1* | 9/2013 | Blankenship | H04W 72/0453 370/329 |

OTHER PUBLICATIONS

3GPP TS 22.368 V10.5.0; "3rd Generation Partnership Project; Technical Specification Group Services and System Aspects; Service requirements for Machine-Type Communications (MTC); Stage 1 (Release 10);" Jun. 2011 (17 pages).
NTT Docomo; "On the Need of Common Search Space for E-PDCCH;" 3GPP TSG RAN WG1 Meeting #68bis, R1-121476; Jeju, Korea; Mar. 26-30, 2012 (4 pages).
Fujitsu; "EPDCCH search space design to support narrow band operation;" 3GPP TSG RAN WG1 #68, R1-120764; Dresden, Germany; Feb. 6-10, 2012 (2 pages).
NTT Docomo; "Issues Regarding LTE Network for Low Cost MTC;" 3GPP TSG RAN WG1 Meeting #67, R1-114082; San Francisco, USA; Nov. 14-18, 2011 (5 pages).
NTT Docomo; "On the need for additional carrier types in Rel-11 CA;" 3GPP TSG RAN WG1 Meeting #66bis, R1-113289; Zhuhai, China; Oct. 10-14, 2011 (4 pages).
Research in Motion et al.; "Design Consideration for E-PDCCH;" 3GPP TSG RAN WG1 Meeting #66, R1-112373; Athens, Greece; Aug. 22-26, 2011 (6 pages).
Fujitsu; "Multiplexing efficiency of ePDCCH"; 3GPP TSG RAN WG1 Meeting #68bis, R1-121198; Jeju, Korea; Mar. 26-30, 2012 (5 pages).
Office Action issued in corresponding Japanese Application No. 2012-109764, mailed Jul. 12, 2016 (7 pages).
Renesas Mobile Europe Ltd.; "On ePDCCH search spaces"; 3GPP TSG-RAN WG1 Meeting #68bis, R1-121398; Jeju, Korea; Mar. 26-30, 2012 (5 pages).
InterDigital Communications, LLC; "Consideration on Search Space Design for ePDCCH in Rel-11"; 3GPP TSG RAN WG1 Meeting #68bis, R1-121318; Jeju, Korea; Mar. 26-30, 2012 (5 pages).
Sharp; "Common search space in ePDCCH"; 3GPP TSG RAN WG1 Meeting #68bis, R1-121354; Jeju, Korea; Mar. 26-30, 2012 (6 pages).
Research in Motion, UK Limited; "Design Consideration for E-PDCCH" 3GPP TSG RAN WG1 Meeting #66bis, R1-113236; Zhuhai, China; Oct. 10-14, 2011 (7 pages).
Extended Search Report issued in corresponding European Application No. 13787796.5, mailed Dec. 3, 2015 (10 pages).
Fujitsu; "Search Space Design for Downlink Control Channel"; 3GPP TSG RAN WG1 Meeting #68, R1-120752; Dresden, Germany; Feb. 6-10, 2012 (6 pages), Sep. 26, 2016.
IPWireless Inc.; "Review of approaches for bandwidth reduction for low complexity MTC LTE UEs"; 3GPP TSG RAN WG1 Meeting #67, R1-114267; San Francisco, USA; Nov. 14-18, 2011 (5 pages).
ZTE Corporation; "TP for evaluation/analysis of reduction of maximum bandwidth"; 3GPP TSG RAN WG1 Meeting #68, R1-120290; Dresden, Germany; Feb. 6-10, 2012 (4 pages).

* cited by examiner

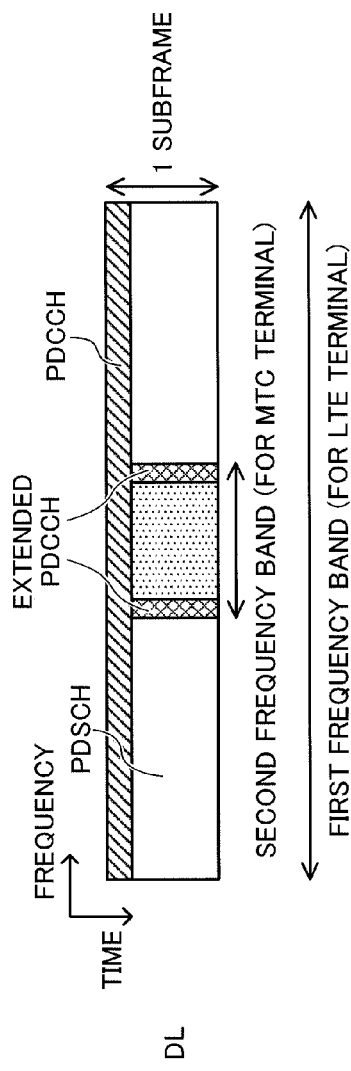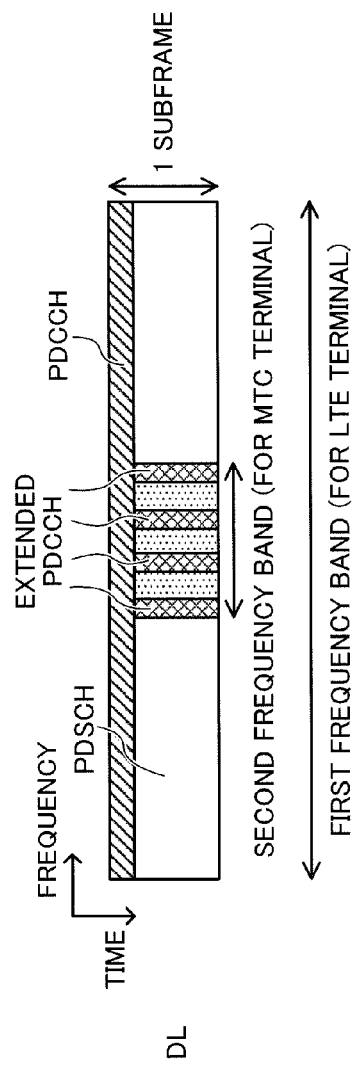

BASE STATION APPARATUS, RADIO COMMUNICATION TERMINAL, RADIO COMMUNICATION SYSTEM AND RADIO COMMUNICATION METHOD

TECHNICAL FIELD

The present invention relates to a base station apparatus, a radio communication terminal, a radio communication system and a radio communication method that are applicable to machine communication systems.

BACKGROUND ART

In recent years, technologies related to machine communication (machine-to-machine communication), in which services are provided through autonomous communication between devices, have been under development. The European telecommunications standards institute (ETSI) defines three domains—namely, the application domain, the network domain, and the device domain—as a machine communication system reference model. Of these, in the device domain, application to lifeline control which covers electricity, gas and water, highway traffic systems (Intelligent Transport System (ITS)) and so on are already under study for practical use.

In the network domain, a cellular system that is based on the provisions of the 3GPP (3rd Generation Partnership Project) is a promising candidate to be employed. Consequently, with the 3GPP, activity to standardize machine communication, which is defined as "MTC (Machine Type Communication)," has started (non-patent literature 1).

CITATION LIST

Non-Patent Literature

Non-patent Literature 1: 3GPP, TS22.368 (V10.5.0), "MTC Communication Aspects," June 2011

SUMMARY OF THE INVENTION

Technical Problem

Now, in LTE (Long Term Evolution), which is agreed upon in the 3GPP, it is possible to achieve a transmission rate of about maximum 300 Mbps on the downlink and about 75 Mbps on the uplink by using a variable band that ranges from 1.4 MHz to 20 MHz. However, MTC is under study on the premise of a comparatively slow communication environment, and, if an LTE system (including Rel. 8/9/10 and later versions) is applied as is to MTC, problems might arise. For example, the requirements for the MTC system are 118.4 kbps for the downlink and 59.2 kbps for the uplink, and are not as high as for an LTE system. Consequently, when a radio communication terminal that is customized for the MTC system (hereinafter referred to as an "MTC terminal") tries to satisfy the requirements of an LTE system, the radio communication terminal would be over-engineered, and its cost of manufacturing would increase.

The present invention has been made in view of the above, and it is therefore an object of the present invention to provide a radio communication terminal, a base station apparatus, a radio communication system and a radio communication method which can reduce the cost required for MTC terminals when the network domain of a machine communication system employs an LTE system.

Solution to Problem

The base station apparatus of the present invention communicates with a first communication terminal in a first frequency band and also communicates with a second communication terminal in a second frequency band of a narrower bandwidth than the first frequency band, and this base station apparatus includes: an allocation control section that allocates an extended downlink control channel which is frequency-division-multiplexed with a downlink shared data channel, in a predetermined frequency region in the second frequency band; and a mapping section that maps a common control signal that is common between the second communication terminals at least, in a common search space of the extended downlink control channel.

Technical Advantage of the Invention

According to the present invention, when the network domain of a machine communication system employs an LTE system, it is possible to reduce the cost required for MTC terminals.

BRIEF DESCRIPTION OF THE DRAWINGS

FIG. 5 provides diagrams to illustrate examples of subframe configurations where extended PDCCHs are arranged, according to the present embodiment;

DESCRIPTION OF EMBODIMENTS

Figure 1:
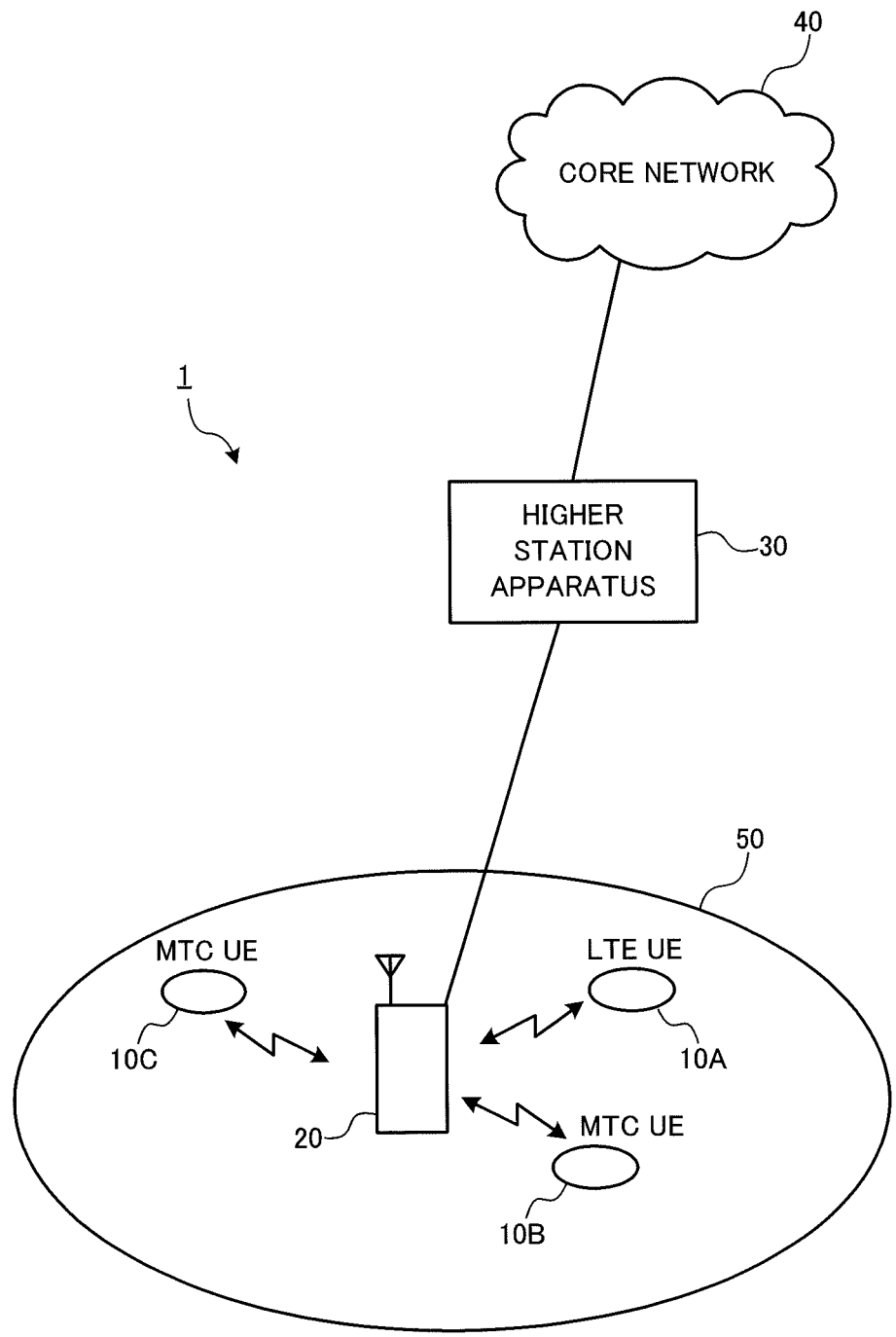
FIG. 1 is a diagram to explain a system configuration of a radio communication system according to the present embodiment.

First, a radio communication system according to the present embodiment will be described with reference to FIG. 1. The radio communication system illustrated in FIG. 1 is an example of employing an LTE system in the network domain of a machine communication system. A radio communication system to support LTE-Advanced (including Rel. 10 and later versions) employs carrier aggregation (CA), which uses a plurality of fundamental frequency blocks (component carriers), where one unit is maximum 20 MHz, to extend the system band up to maximum 100 MHz. The following description will assume, as an example, an LTE system where the system band is set to maximum 20 MHz on both the downlink and the uplink.

As illustrated in FIG. 1, a radio communication system 1 is configured to include a radio base station apparatus 20, and a plurality of radio communication terminals 10A, 10B and 10C that connect with the radio base station apparatus 20 by radio for radio communication. For example, the radio communication terminal 10A (first communication terminal) is a user terminal (hereinafter an "LTE terminal") to support LTE (Rel. 10) or LTE-Advanced (including Rel. 10 and later versions), and the other radio communication terminals 10B and 10C are MTC terminals (second communication terminals) to serve as communication devices in a machine communication system.

The base station apparatus 20 is connected with a higher station apparatus 30, and this higher station apparatus 30 is connected with a core network 40. A plurality of radio communication terminals 10A, 10B and 10C are able to communicate with the base station apparatus 20 in a cell 50. Note that the higher station apparatus 30 may be, for example, an access gateway apparatus, a radio network controller (RNC), a mobility management entity (MME) and so on, but is by no means limited to these.

The radio communication system 1 is able to support, as radio access schemes, OFDMA (Orthogonal Frequency Division Multiple Access) with respect to the downlink, and SC-FDMA (Single-Carrier-Frequency-Division Multiple Access) with respect to the uplink. Note that the radio access schemes are by no means limited to these. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing the system band into bands formed with one resource block or continuous resource blocks, and allowing a plurality of terminals to use mutually different bands. The LTE terminal has communication capacity to be able to support maximum 20 MHz on both the downlink and the uplink.

Figure 2:
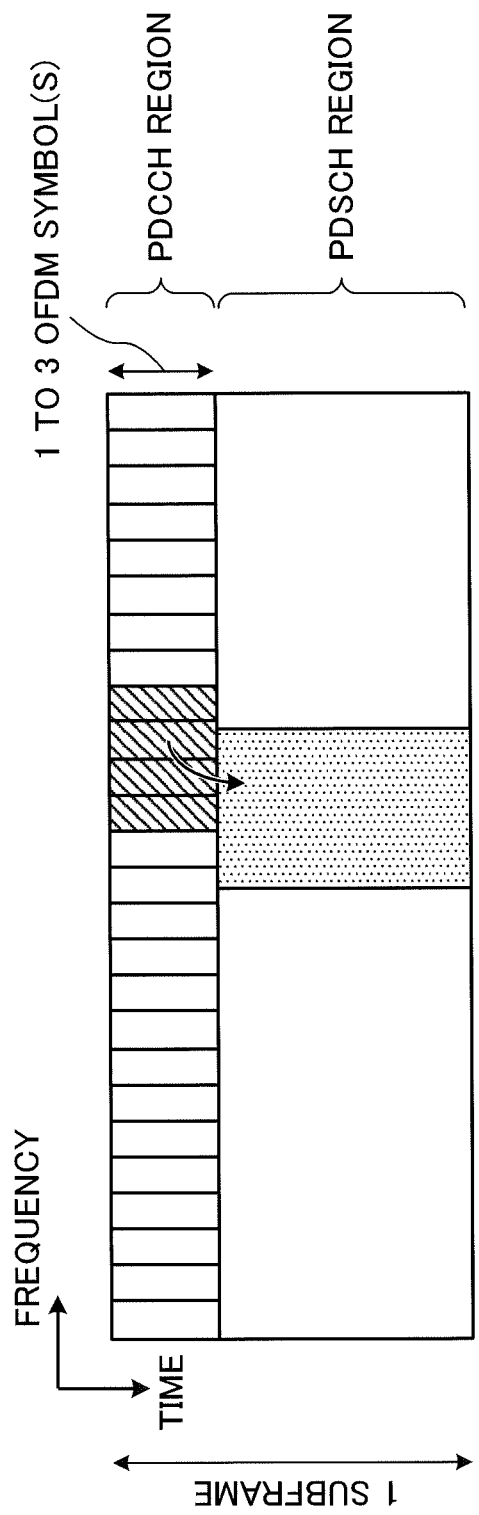
FIG. 2 is a diagram to explain a subframe configuration where a conventional PDCCH is arranged.

Here, channel configurations in the LTE system will be described. FIG. 2 is a diagram to illustrate an example of a radio frame (for example, one subframe) where downlink transmission is applied. As illustrated in FIG. 2, in the LTE system, predetermined OFDM symbols (one to three OFDM symbols) from the top of each subframe are secured as a resource region (PDCCH region) for a downlink control channel (PDCCH: Physical Downlink Control Channel). Also, in radio resources following the predetermined symbols from the top of the subframe, a resource region (PDSCH region) for a downlink shared data channel (PDSCH: Physical Downlink Shared CHannel) is secured.

In the PDCCH region, downlink control information (DCI) for the user terminals is allocated. The downlink control information (DCI) includes allocation information in the PDSCH region and so on, and the user terminals demodulate the data and broadcast information (for example, system information such as SIBs (System Information Blocks)) allocated to the PDSCH, based on the downlink control information. In this way, in each subframe, signals for downlink data for user terminals and signals for downlink control information for receiving that downlink data are time-division-multiplexed and transmitted.

Also, in the LTE-A system, for example, multiple-user MIMO (MU-MIMO) transmission, whereby transmission information sequences are transmitted from different transmitting antennas to different users simultaneously, is defined. In MU-MIMO transmission, it is possible to transmit data to a plurality of user terminals UE in the same time and the same frequency. When downlink control information for many user terminals UE is allocated to the PDCCH region in this way, cases might occur where the PDCCH region for transmitting downlink control information runs short. In this case, the number of user terminals UE that can be multiplexed in the PDSCH region is limited.

As a method for solving such shortage of the PDCCH region, it may be possible to extend the PDCCH allocation region outside the control region of maximum three OFDM symbols from the subframe top (that is, develop new PDCCH regions apart from the conventional PDSCH region). For example, a method of frequency-division-multiplexing the PDSCH and extended PDCCHS in the PDSCH region (frequency-division (FDM) approach) may be possible. A PDCCH that is frequency-division-multiplexed with the PDSCH in this way is referred to as an "extended PDCCH" (also referred to as an "extended downlink control channel," an "E-PDCCH," an "enhanced PDCCH," an "FDM-type PDCCH," a "UE-PDCCH," and so on) for distinction from the conventional PDCCH.

Figure 3A:
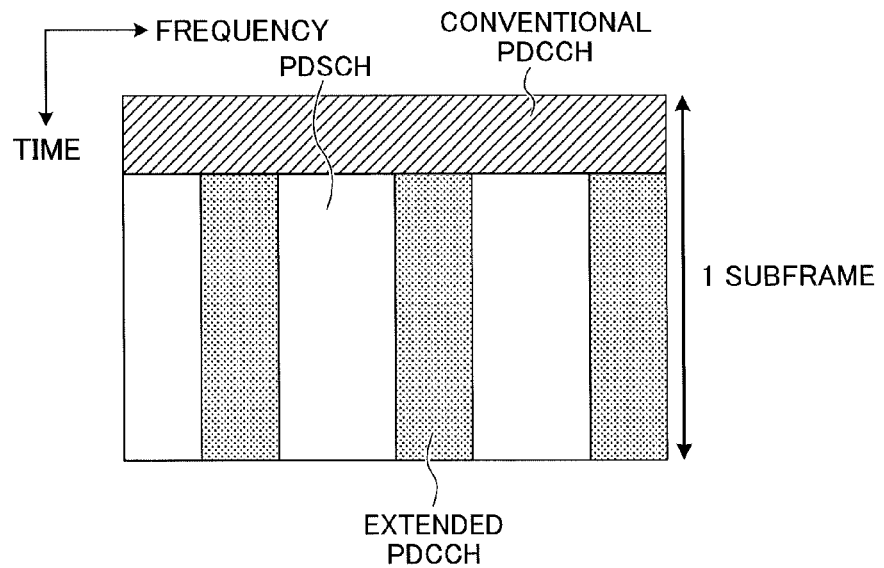
FIG. 3 provides diagram to explain subframe configurations where extended PDCCHs are arranged.

FIG. 3 illustrates examples of frame configurations that are used when the frequency division approach is applied. In the frame configuration illustrated in FIG. 3A, a conventional PDCCH and extended PDCCHs are arranged. The conventional PDCCH is arranged over the entire system band from the top of a frame which serves as the transmission time interval (hereinafter referred to as a "subframe"), to a predetermined OFDM symbol (covering maximum three OFDM symbols). In radio resources following the OFDM symbols where the conventional PDCCH is arranged, extended PDCCHs are arranged to be frequency-division-multiplexed with PDSCHs.

Figure 3B:
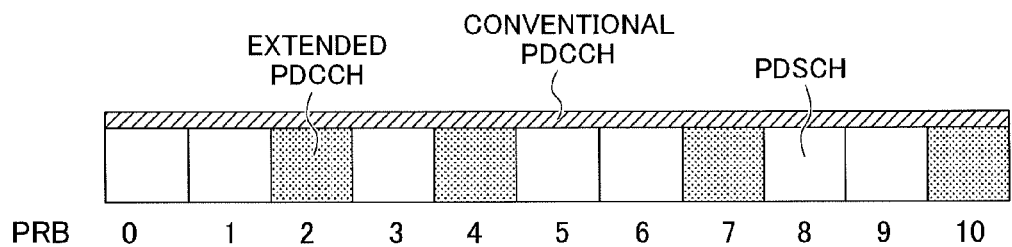

Also, as illustrated in FIG. 3B, the system band is formed with predetermined frequency domain units. This predetermined frequency domain unit may be, for example, a physical resource block (PRB) (also simply referred to as a "resource block" (RB)), a resource block group (RBG) which is formed with a plurality of consecutive physical resource blocks, and so on. FIG. 3B illustrates a case where resource blocks are used as the predetermined frequency domain units and resource blocks in part of the system band are allocated to extended PDCCHs.

Also, as a frame configuration for Rel. 11 and later versions, a new carrier type (extension carrier type) which provides no conventional PDCCH from the top of a subframe to a predetermined OFDM symbol (covering maximum three OFDM symbols), is under study. In subframes where this extension carrier type is applied, extended PDCCHs alone may be allocated as a downlink control channel, without providing the conventional PDCCH. Furthermore, in subframes where the extension carrier type is applied, extended PDCCHs may also be allocated to maximum three OFDM symbols from the top (see FIG. 3C).

Now, as noted earlier, MTC is under study on the premise of a comparatively slow communication environment, and, if an LTE system is applied as is to MTC, problems such as increased manufacturing cost might arise. So, upon designing a configuration to connect the MTC terminals to an LTE system having the above-described frame configuration by radio, the present inventors have found that the it is effective to design the MTC terminals to support only narrow frequency bands compared to the LTE terminal, from the perspective of reducing the cost of the MTC terminals (see FIG. 4).

However, when the MTC terminals establish wireless connection with the LTE system, the MTC terminals need to perform an initial access (initial connection) process and so on with the base station apparatus, using, for example, a downlink shared channel (DL-SCH: Downlink Shared Channel), just like the LTE terminal. Here, the initial connection process refers to the connection process (including receiving system information (for example, SIBs), a random access process, and so on), to perform before transmitting/receiving user data.

Figure 4:
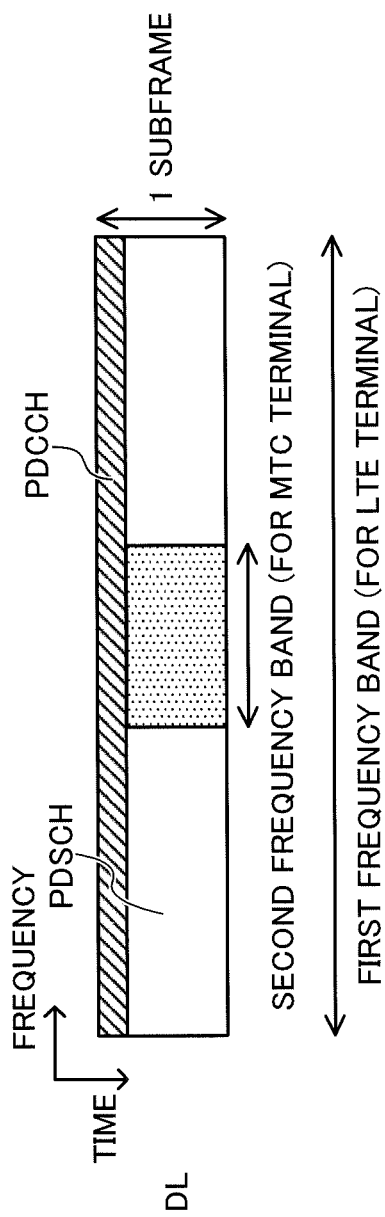
FIG. 4 is a diagram to explain an example of the relationship between an LTE terminal and an MTC terminal.

However, when, as illustrated in FIG. 4, the bandwidth which the MTC terminals support is made narrower than the bandwidth which the LTE terminal supports, the MTC terminals are unable to demodulate the control signals allocated to the PDCCH arranged across the frequency band which the LTE terminal supports. That is, although the base station apparatus is able to perform the initial connection process with the LTE terminal using the conventional PDCCH, it becomes difficult to perform the initial connection process with the MTC terminals using the conventional PDCCH. So, the present inventors have focused on the fact that the MTC terminals are able to perform the initial connection process by using extended PDCCHs that can be arranged selectively in predetermined frequency regions (for example, in predetermined PRBs).

Meanwhile, with extended PDCCHs presently under study in the LTE system, a study is in progress to allow a base station apparatus to acquires user terminal information (UE capability) by making initial connection with an LTE terminal by using the conventional PDCCH, and, after that, set parameters of extended PDCCHs (the allocation positions and so on) based on the acquired user terminal information. That is, even when extended PDCCHs are arranged, the initial connection process needs to be performed using the conventional PDCCH.

Consequently, the present inventors have conceived of designing the configuration of extended PDCCHs such that radio communication terminals (MTC terminals and/or LTE terminals) are able to make initial connection to a base station apparatus using extended PDCCHs, and thereupon arrived at the present invention.

Now, the present embodiment will be described below in detail with reference to the accompanying drawings. Note that, although the present embodiment will be described with reference to an example providing LTE terminals and MTC terminals to support different frequency bands as radio communication terminals, the terminals to which the present embodiment can be applied are by no means limited to these. Also, the present embodiment is applicable to radio communication by one of LTE terminals and MTC terminals.

(First Example)

A configuration of extended PDCCHs according to a first example will be described with reference to FIG. 5. In the following description, a case will be described as an example where a base station apparatus communicates with first communication terminals (for example, LTE terminals) in a first frequency band (for example, in a bandwidth of 20 MHz), and also performs machine communication with second communication terminals (for example, MTC terminals) in a second frequency band of a narrower bandwidth than the first frequency band.

FIGS. 5A and 5B are examples of frame configurations to apply to the LTE terminals and the MTC terminals. In the frame configuration illustrated in FIG. 5, a PDCCH (conventional PDCCH) that is time-division-multiplexed with PDSCHs, and extended PDCCHs that are frequency-division-multiplexed with the PDSCHs, are arranged. The conventional PDCCH is arranged from the top of a subframe, which serves as the transmission time interval, to a predetermined OFDM symbol (covering maximum three OFDM symbols), over the entire first frequency band. The extended PDCCHs are arranged in radio resources following the predetermined OFDM symbol.

The LTE terminals receive and decodes the PDCCH arranged across the first frequency band, and receives the PDSCHs based on downlink control information (DCI) included in the PDCCH. Upon the initial connection process of the LTE terminals, the base station apparatus maps common control signals which are common between the LTE terminals, in a common search space (CSS) of the PDCCH. For example, the LTE terminals receive system information (for example, SIBs) allocated to the PDSCH based on common control information acquired by blind decoding. Note that the common search space represents the range where the radio communication terminals UE in the cell should blind-decode common control information.

As noted earlier, the bandwidths which the MTC terminals are able to support on the uplink and the downlink are limited to narrow bandwidths compared to the bandwidths which the LTE terminals support (for example, 20 MHz). That is, while both the MTC terminals and the terminals can use the second frequency band, only the LTE terminals, and not the MTC terminals, can use the first frequency band which is different from the second frequency band. Note that, although FIG. 5 illustrates cases where the second frequency band is included in the first frequency band, this is by no means limiting.

Also, upon the initial connection process of the MTC terminals, the base station apparatus arranges extended PDCCHs in predetermined frequency regions (for example, PRBs) in the second frequency band, and maps common control signals which are common between the MTC terminals, in common a search space (common SS) of the extended PDCCHs. For example, the MTC terminals are able to receive system information (for example, SIBs) allocated to the PDSCH, based on common control information acquired by blind decoding of the extended PDCCHs.

In this way, upon communication with the MTC terminals, the base station apparatus arranges extended PDCCHs in the second frequency band, which at least MTC terminals support, and the MTC terminals perform an initial connection process with the base station apparatus using common control information that is allocated to a common search space of the extended PDCCHs.

The positions of extended PDCCHs to be arranged in the second frequency band may assume, for example, the configurations illustrated in FIGS. 5A and 5B. FIG. 5A illustrates a case where extended PDCCHs are arranged at both ends of the second frequency band in the frequency axis direction. For example, one pair of extended PDCCHs are arranged at both ends of the second frequency band, and common control information for receiving system information and so on is allocated in the common search space of the extended PDCCHs. Also, in this case, the base station apparatus allocates system information and so on which are demodulated by the common control signal, in the PDSCHs arranged in the second frequency band.

In this way, by arranging extended PDCCHs at both ends of the second frequency band, it is possible to map common control signals to both ends of the second frequency band, so that a frequency diversity effect can be achieved. Obviously, the allocation unit of extended PDCCHs is not limited to one PRB pair. Also, it is equally possible to change the allocation unit of extended PDCCHs dynamically in accordance with the communication environment.

FIG. 5B illustrates a case where extended PDCCHs are distributed and arranged over a plurality of frequency regions in the second frequency band in the frequency axis direction. In this case, common control signal can be distributed and mapped in a plurality of extended PDCCHs (distributed mapping), so that it is possible to achieve a frequency diversity effect more effectively.

Note that, when the MTC terminals perform the initial connection process using extended PDCCHs arranged in the second frequency band, the MTC terminals need to know the positions of the resources where the extended PDCCHs are arranged (for example, the common search space of the extended PDCCHs). Consequently, with the present embodiment, the base station apparatus is able to include information related to the positions of resources where extended PDCCHs are allocated, in broadcast information, and report this information to the MTC terminals via a physical broadcast channel (PBCH).

Besides, a configuration to decide in advance the positions where the extended PDCCHs to use in the initial connection process are arranged (the common search space of the extended PDCCHs) may be possible. In this case, it is possible to skip the process of reporting information related to the positions of extended PDCCHs from the base station apparatus to the MTC terminals.

Also, it is equally possible to use the extended PDCCHs (the common search space of the extended PDCCHs) to use in the initial connection process as UE-specific search spaces (UE-SSs) of the extended PDCCHs.

Also, after the initial connection process is finished in the MTC terminals, the base station apparatus arranges extended PDCCHs in arbitrary frequency regions (for example, PRBs) in the second frequency band, and maps UE-specific control information for each MTC terminal in the UE-specific search spaces (UE-SSs) of the extended PDCCHs. Each MTC terminal is able to receive the data allocated to the PDSCHs based on the UE-specific control information acquired by the blind decoding of the extended PDCCHs.

Note that the UE-specific search spaces represent the range where each radio communication terminal should blind-decode dedicated control information. Also, the UE-specific control information includes, for example, PDSCH allocation information (DL assignments), PUCCH scheduling information (UL grants) and so on.

A configuration to report the positions where the extended PDCCHs to use in data transmission after the initial connection process are arranged (UE-specific search spaces), to the MTC terminals, using higher layer signaling, after RRC connection is established, is possible. Also, a configuration may be possible in which, similar to the extended PDCCHs (common search spaces) to use in the initial connection process, the positions where the extended PDCCHs to use in data transmission after the initial connection process are arranged are reported to the MTC terminal by means of a broadcast signal via a physical broadcast channel (PBCH), or are decided in advance. Note that the extended PDCCHs in this case can also be arranged in the regions illustrated in FIGS. 5A and 5B.

Also, when not transmitting downlink control information to the MTC terminals (that is, when not arranging extended PDCCHS in the second frequency band), the base station apparatus is able to arrange the downlink shared data channel (PDSCH) for the LTE terminals in the second frequency band, and allocate data for the LTE terminals. By this means, even when the MTC terminals do not communicate, it is possible to effectively utilize the radio resources of the second frequency band.

(Second Example)

Figure 3C:
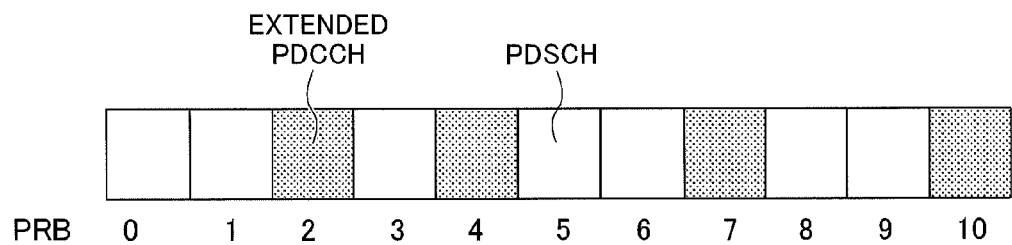

As described above, as a frame configuration for Rel. 11 and later versions, a new carrier type (extension carrier type) which provides no conventional PDCCH from the top of a subframe to a predetermined OFDM symbol (covering maximum three OFDM symbols), is under study (see FIG. 3C). So, a case will be described with a second example where the extension carrier type is applied to LTE terminals and/or MTC terminals.

Figure 6A:
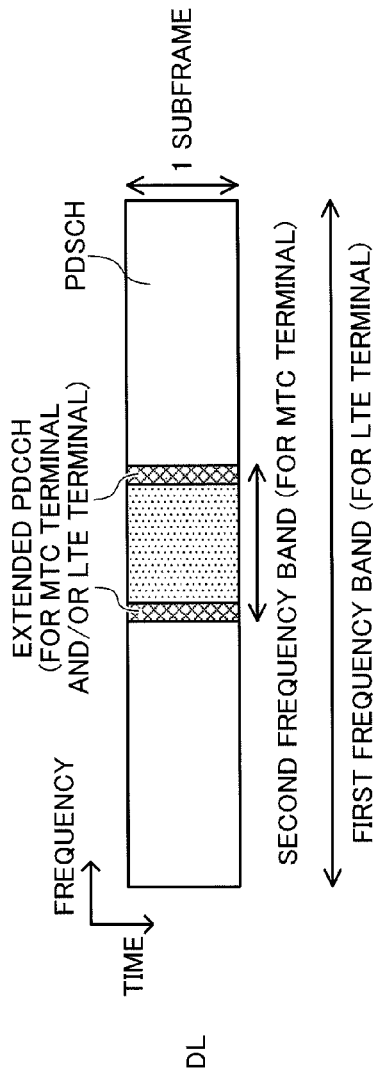
FIG. 6 provides diagrams to illustrate other examples of subframe configurations where extended PDCCHs are arranged, according to the present embodiment.

FIG. 6A is an example of a subframe configuration where the extension carrier type is applied. With the frame configuration illustrated in FIG. 6A, a case is illustrated in which the base station apparatus allocates extended downlink control channels from the top of a subframe to the last symbol in predetermined frequency regions in the second frequency band.

Upon the initial connection process of the MTC terminals, the base station apparatus arranges extended PDCCHs in predetermined frequency regions (for example, PRBs) in the second frequency band, and maps common control signals, that are shared between the MTC terminals, to the common search space (common SS) of the extended PDCCHs. For example, the MTC terminals are able to receive the system information (for example, SIBs) allocated to the PDSCHs, based on common control information acquired by the blind decoding of the extended PDCCHs.

On the other hand, when the extension carrier type is applied (when the extension carrier type is applied in PCell while carrier aggregation is applied), the LTE terminals also need to perform the initial connection process using extended PDCCHs. Consequently, upon the initial connection process of the LTE terminals, like the MTC terminals, it is possible to receive the system information (for example, SIBs) and so on allocated to the PDSCHs based on the common control signals allocated to the common search space of the extended PDCCHs.

Also, as for the positions of extended PDCCHs arranged in the second frequency band, for example, a configuration to arrange extended PDCCHs at both ends of the second frequency band along the frequency axis direction may be possible (see FIG. 6A). Also, as illustrated in FIG. 5B above, a configuration to distribute and arrange extended PDCCHs in a plurality of frequency regions in the second frequency band along the frequency axis direction is also possible.

As described above, upon the initial connection process, the LTE terminals and the MTC terminal receive the system information (for example, SIBs) and so on allocated to the PDSCHs, based on common control signals acquired by the blind-decoding of the common search space of the extended PDCCHs. At this time, when common system information is transmitted to the LTE terminals and the MTC terminals, as illustrated in FIG. 6A, the LTE terminals and the MTC terminals can share the extended PDCCHs (common search spaces of the extended PDCCHs). By this means, it is possible to improve the efficiency of use of radio resources.

Note that, when the initial connection process is carried out using extended PDCCHs arranged in the second frequency band, the LTE terminals and the MTC terminals need to know the positions of the resources where the extended PDCCHs are arranged (for example, the common search space of the extended PDCCHs). Consequently, the base station apparatus is able to include information related to the positions of the resources where the extended PDCCHs are allocated, in broadcast signals, and report this broadcast signal to the LTE terminals and MTC terminals via a physical broadcast channel (PBCH).

Besides, a configuration to decide in advance the positions (common search space) to arrange the extended PDCCHs to use in the initial connection process may be used as well. In this case, it is possible to skip the process of reporting information related to the positions of extended PDCCHs from the base station apparatus to the LTE terminal and the MTC terminals.

Also, it is equally possible to use the extended PDCCHs (the common search space of the extended PDCCHs) to use in the initial connection process as UE-specific search spaces (UE-SSs) of the extended PDCCHs.

Also, after the initial connection process is finished in the LTE terminals/MTC terminals, the base station apparatus arranges extended PDCCHs in arbitrary frequency regions (for example, PRBs) in the second frequency band, and also maps UE-specific control information for each LTE terminal and MTC terminal in the UE-specific search spaces of the extended PDCCHs. Each LTE terminal and MTC terminal is able to receive the data allocated to the PDSCHs based on UE-specific control information acquired by the blind decoding of the extended PDCCHs.

A configuration to report the positions where the extended PDCCHs to use in data transmission after the initial connection process are arranged to the LTE terminals and MTC terminals, using higher layer signaling, after RRC connection is established, is possible. Also, a configuration may be possible in which, similar to the extended PDCCHs (common search spaces) to use in the initial connection process, the positions where the extended PDCCHs to use in data transmission after the initial connection process are arranged are reported to the LTE terminals and the MTC terminal by means of a broadcast signal via a physical broadcast channel (PBCH), or are decided in advance.

Note that, although a case has been illustrated above with FIG. 6A where the extended PDCCHs to use in the initial connection process (an extended PDCCH for the LTE terminals and an extended PDCCH for the MTC terminals) are provided in the second frequency band on a shared basis, these may be provided in separate frequency bands as well. In particular, when system information (for example, SIBs) varies between the LTE terminals and the MTC terminals, it is preferable to arrange the extended PDCCH for the LTE terminals in the first frequency band and allocate the extended PDCCH for the MTC terminals in the second frequency band.

Figure 6B:
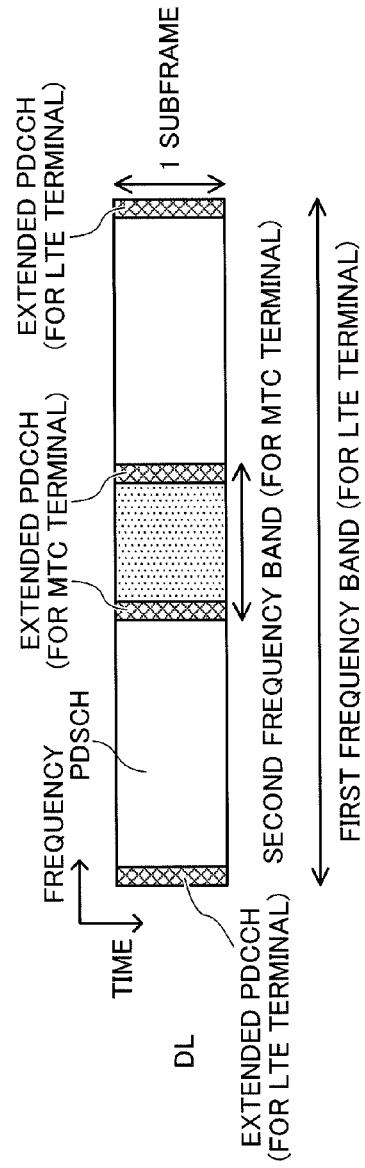

To be more specific, as illustrated in FIG. 6B, it is possible to arrange extended PDCCHs for the LTE terminals at both ends of the first frequency band and arrange extended PDCCH for the MTC terminals at both ends of the second frequency band, along the frequency axis direction. In this case, the LTE terminals are able to perform the initial connection process using the extended PDCCHs arranged at both ends of the first frequency region, the MTC terminals perform the initial connection process using the extended PDCCHs arranged at both ends of the second frequency region. Also, by arranging extended PDCCHs at both ends of the first frequency region and the second frequency region, a frequency diversity effect can be achieved.

In addition, extended PDCCHs may be distributed and arranged in a plurality of frequency regions in the first frequency band and/or the second frequency band along the frequency axis direction. In this case, the common control signal can be distributed and mapped in a plurality of extended PDCCHs (distributed mapping), so that it is possible to achieve a frequency diversity effect more effectively.

Part or all of the extended PDCCHs for the LTE terminals may be allocated to the frequency resources for the extended PDCCHs for the MTC terminals arranged in the second frequency band.

Note that the positions (common search space, UE-specific search space) where extended PDCCHs to allocate to the first frequency band are arranged may be controlled in the same way as extended PDCCHs to allocate to the above second frequency band.

Also, when not transmitting downlink control information to the MTC terminals (when not arranging extended PDCCHs in the second frequency region), the base station apparatus may arrange a downlink shared data channel (PDSCH) for the LTE terminals in the second frequency band and allocate data for the LTE terminals. By this means, even when the MTC terminals do not communicate, it is still possible to utilize the radio resources of the second frequency band effectively.

(Radio Communication System)

Figure 7:
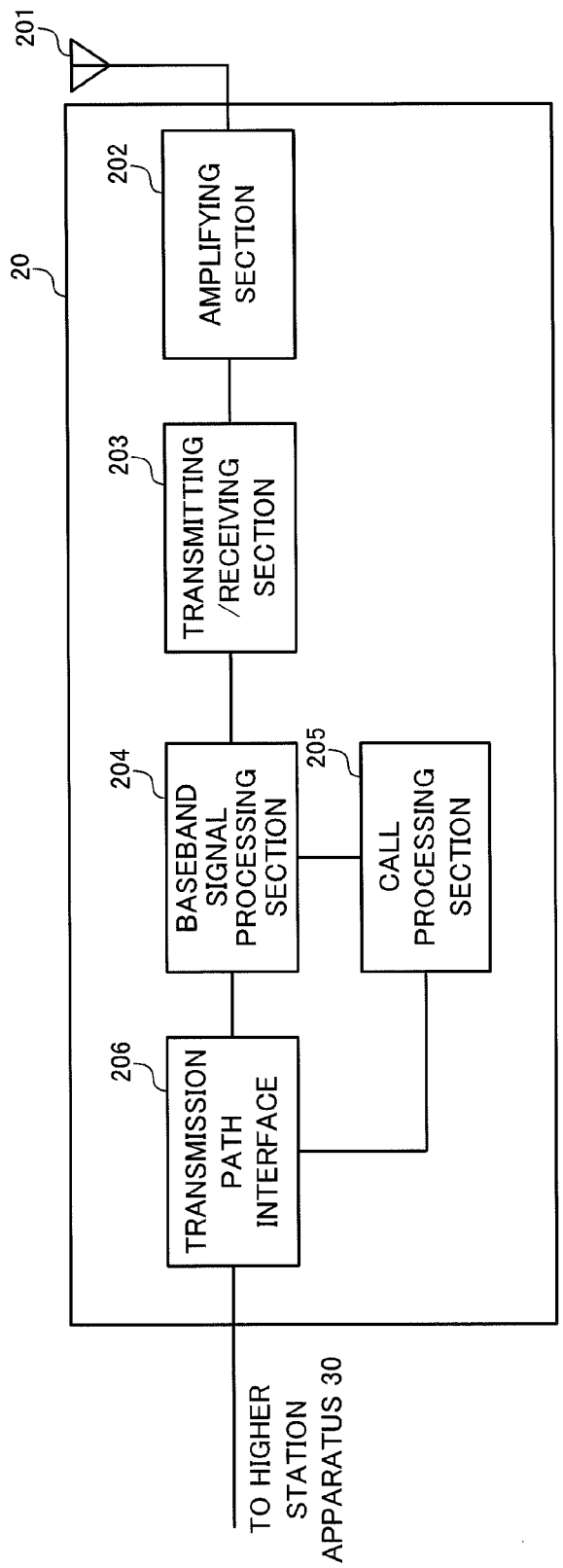
FIG. 7 is a block diagram to illustrate an overall configuration of a base station apparatus according to the present embodiment.

Now, a radio communication system according to the present embodiment will be described in detail. FIG. 7 is a block diagram illustrating an overall configuration of a base station apparatus according to the present embodiment. The base station apparatus 20 includes a transmitting/receiving antenna 201, an amplifying section 202, a transmitting/receiving section 203, a baseband signal processing section 204, a call processing section 205, and a transmission path interface 206. Transmission data that is transmitted from the base station apparatus 20 to MTC terminals (radio communication terminals 10B and 10C in FIG. 1) on the downlink is input from the higher station apparatus 30 into the baseband signal processing section 204 via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a preceding process. Furthermore, a signal of a physical downlink control channel which is a downlink control channel, is also subjected to transmission processes such as channel coding, an inverse fast Fourier transform and so on.

Also, the baseband signal processing section 204 reports control information for allowing each radio communication terminal 10 to perform radio communication with the base station apparatus 20, to the radio communication terminals 10 connected to the same cell, through a broadcast channel. The information for allowing communication in the cell includes, for example, the uplink or downlink system bandwidth, root sequence identification information (root sequence index) for generating random access preamble signals in the PRACH (Physical Random Access Channel), and so on.

A baseband signal that is output from the baseband signal processing section 204 is converted into a radio frequency band in the transmitting/receiving section 203. The amplifying section 202 amplifies the radio frequency signal subjected to frequency conversion, and outputs the result to the transmitting/receiving antenna 201.

Meanwhile, as for a signal to be transmitted from the radio communication terminals 10 to the base station apparatus 20 on the uplink, a radio frequency signal received by the transmitting/receiving antennas 201 is amplified in the amplifying sections 202, converted into a baseband signal through frequency conversion in the transmitting/receiving sections 203, and input in the baseband signal processing section 204.

The baseband signal processing section 204 applies an FFT process, an IDFT process, error correction decoding, a MAC retransmission control receiving process, and RLC layer and PDCP layer receiving processes to the transmission data that is included in the baseband signal received on the uplink. The decoded signal is transferred to the higher station apparatus 30 through the transmission path interface 206.

The call processing section 205 performs call processing such as setting up and releasing communication channels, manages the state of the base station apparatus 20, and manages the radio resources.

Figure 8:
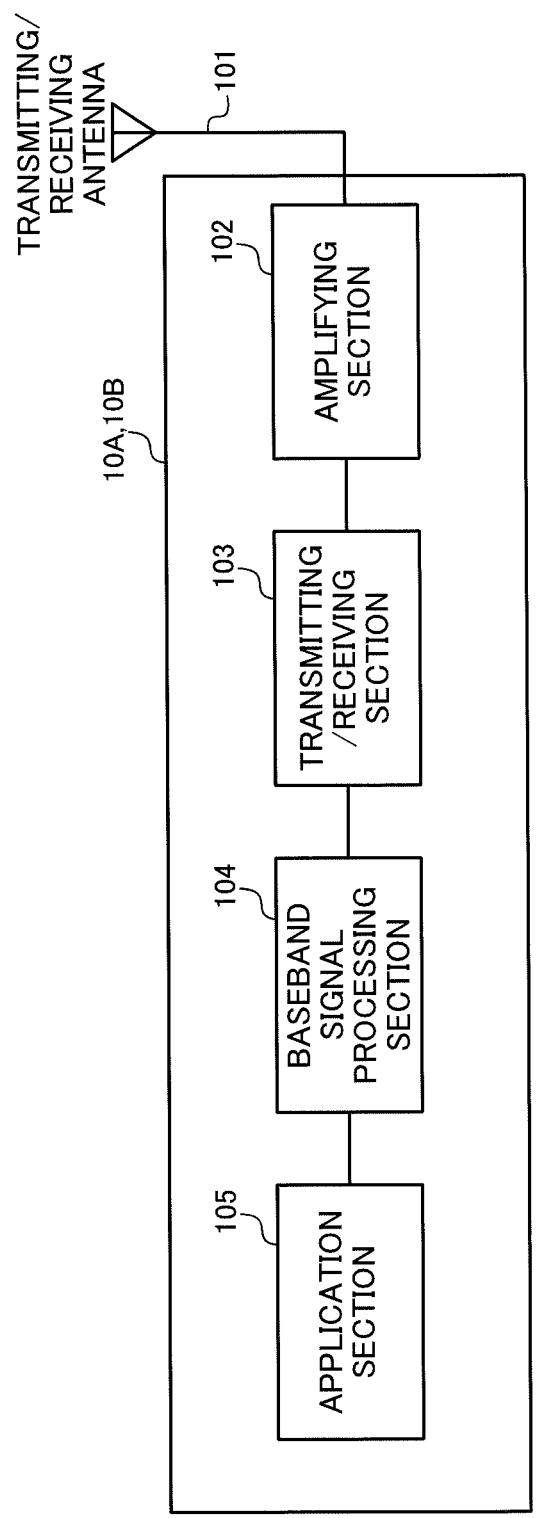
FIG. 8 is a block diagram to illustrate an overall configuration of a radio communication terminal according to the present embodiment.

FIG. 8 is a block diagram to explain an overall configuration of a radio communication terminal according to the present embodiment. The radio communication terminal has a transmitting/receiving antenna 101, an amplifying section 102, a transmitting/receiving section 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101.

Figure 9:
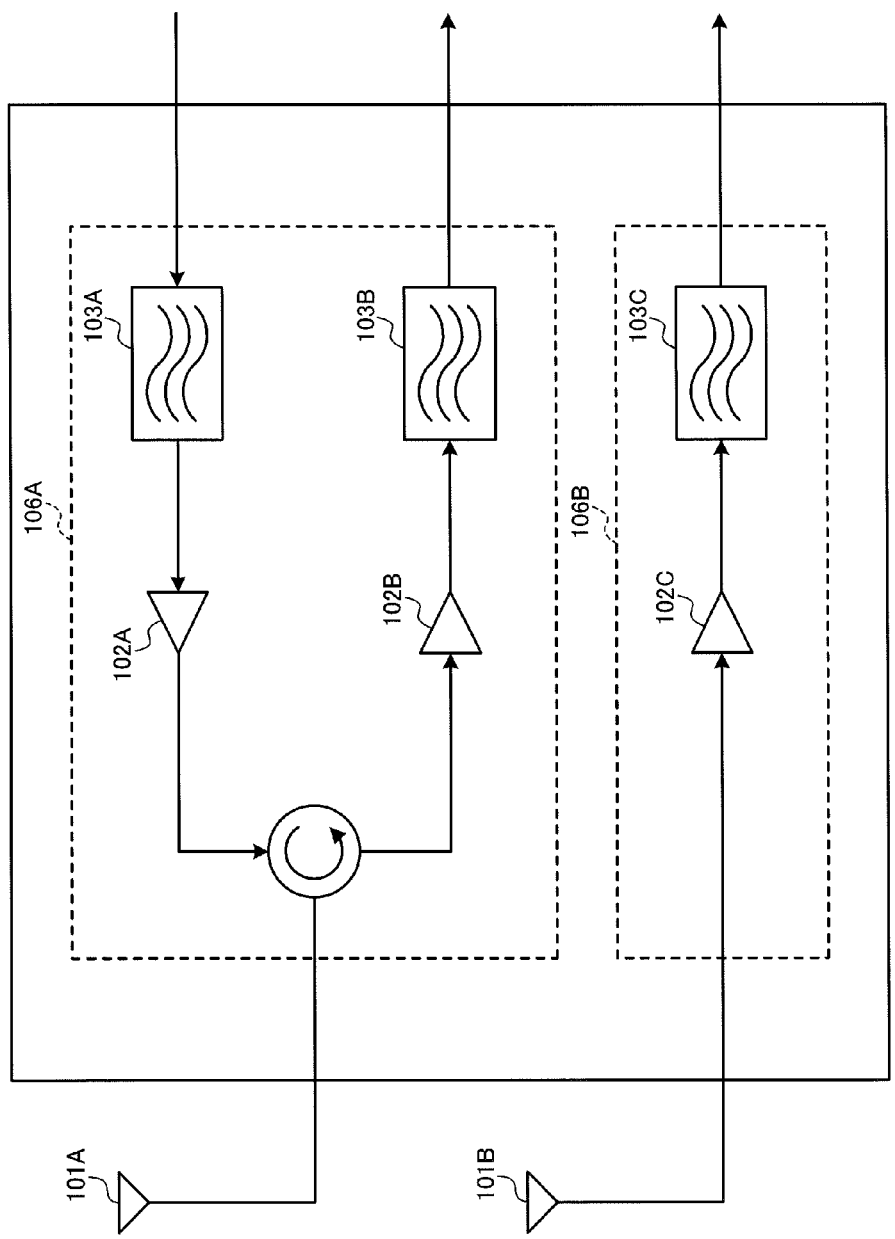
FIG. 9 is a circuit diagram to explain a configuration example of transmitting/receiving ports in an MTC terminal.

FIG. 9 is a circuit diagram to explain a configuration example of transmitting/receiving ports in the MTC terminals (radio communication terminals 10A and 10B) according to the present embodiment. As illustrated in FIG. 9, the radio communication terminals 10B and 10C each have a transmitting/receiving port 106A and a receiving port 106B which correspond to the amplifying section 102 and the transmitting/receiving section 103, respectively. The transmitting/receiving port 106A is connected with a transmitting/receiving antenna 101A, and the receiving port 106B is connected with a receiving antenna 101B. By this means, a 1-branch diversity transmission sequence and a 2-branch diversity receiving sequence are realized.

The transmitting/receiving port 106A has, as the transmitting sequence, a transmission filter 103A that cuts signals outside the uplink transmission band, and a high-power amplifier 102A that amplifies signals to transmit on the uplink. Also, as the receiving sequence, an LNA 102B that amplifies signals received on the downlink, and a receiving filter 103B that cuts signals outside the receiving band, are provided. The receiving port 106B has an LNA 102C that amplifies signals that are received on the downlink, and a receiving filter 103C that cuts signals outside the receiving band.

The bands which the MTC terminals (radio communication terminals 10B and 10C) can support on the uplink and the downlink are limited to narrow bands compared to the maximum band (20 MHz) in which the LTE terminal (radio communication terminal 10A) can communicate on the uplink. Consequently, compared to the LTE terminal, the performance to be demanded of the ports is alleviated. For example, the bands which the transmission filter 103A and receiving filters 103B and 103C of the MTC terminals support may be narrower than the bands which the transmission filter and receiving filter of the LTE terminal supports. Also, the output of the high-power amplifier 102A of the MTC terminals may be lower than the output of the high-power amplifier of the LTE terminal. In this way, with the radio communication system 1 according to the present embodiment, it is possible to alleviate the transmission performance of the radio communication terminals 10B and 10C, and, as a result, reduce the cost and power consumption of the radio communication terminals 10B and 10C.

Figure 10:
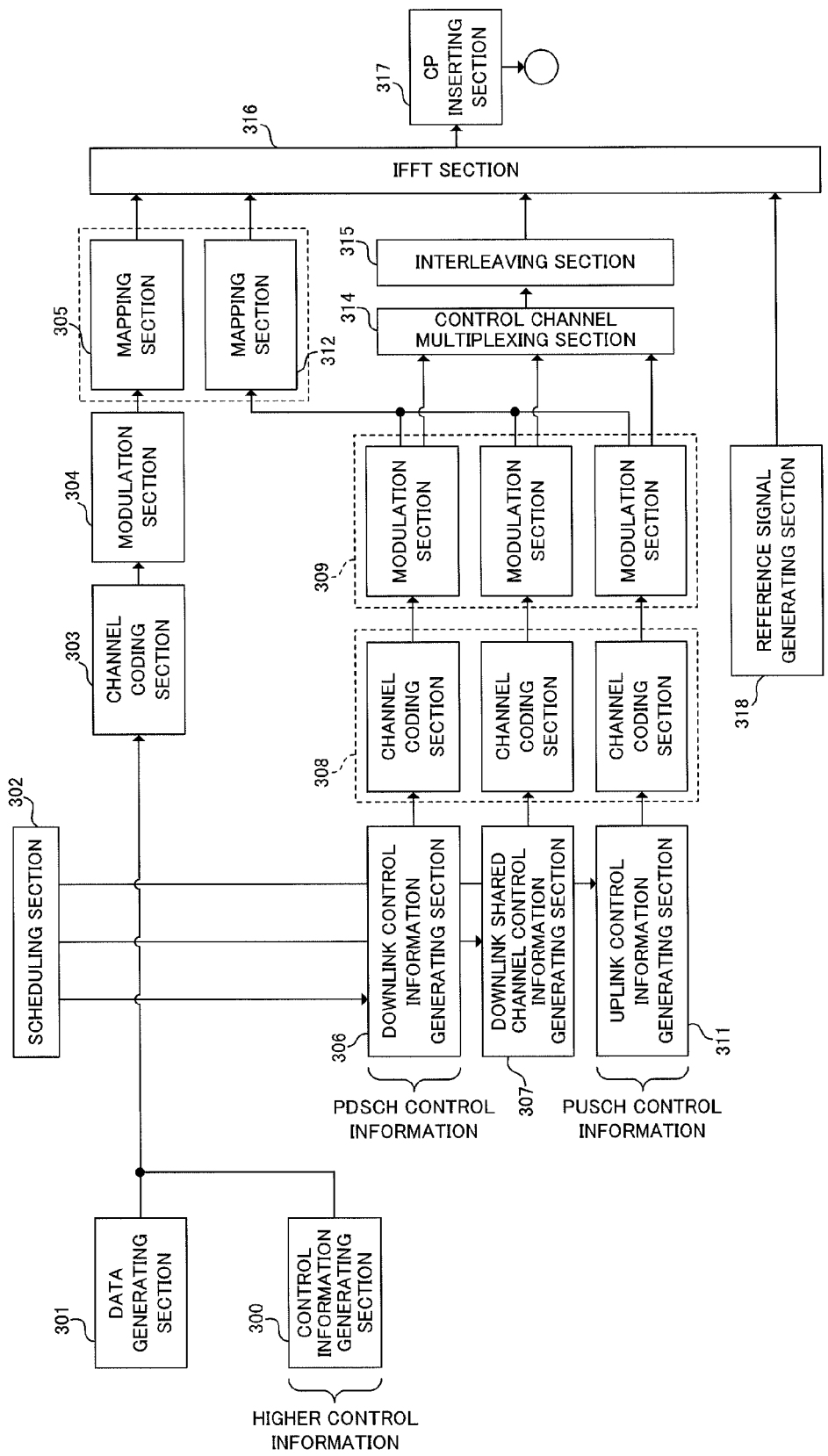
FIG. 10 is a block diagram to illustrate a configuration of a baseband processing section in a base station apparatus according to the present embodiment.

FIG. 10 is a functional block diagram of a baseband signal processing section 204 provided in the base station apparatus 20 according to the present embodiment, and part of the higher layers. The baseband signal processing section 204 primarily illustrates the function blocks of transmission processing sections. Transmission data for the LTE terminal (radio communication terminal 10A) and the MTC terminals (radio communication terminal 10B, 10C) connected with this base station apparatus 20 by wireless connection is transferred from the higher station apparatus 30 to the base station apparatus 20.

A control information generating section 300 generates higher control signals to send through higher layer signaling (for example, RRC signaling), on a per terminal basis. For example, after the MTC terminals and/or the LTE terminal finishes the initial connection process, the control information generating section 300 generates a higher control signal including information related to the allocation positions of extended PDCCHs to apply to data transmission for these terminals.

The data generating section 301 outputs transmission data transferred from the higher station apparatus 30 as user data separately.

The scheduling section 302 controls the positions of frequency regions (for example, PRBs) where extended downlink control channels and so on are arranged, resource allocation for each radio communication terminal, and so on. The scheduling section 302 receives as input transmission data and retransmission commands from the higher station apparatus 30, and also receives as input channel estimation values, resource block CQIs, and the type of terminals (as to whether a terminal is an MTC terminal or an LTE terminal) from the receiving section having measured uplink received signals. Also, from the uplink received signals, the scheduling section 302 schedules the MTC terminals and the LTE terminal (which may be an LTE-A terminal as well) separately.

Also, the scheduling section 302 schedules uplink and downlink control information and shared channel control information (common control information) and so on, with reference to the retransmission commands, channel estimation values and CQIs. A propagation path in mobile communication varies differently per frequency, due to frequency selective fading. So, upon transmission of user data to the LTE terminal, the scheduling section 302 applies adaptive frequency scheduling, and allocates resource blocks of good communication quality on a per subframe basis. In adaptive frequency scheduling, for each resource block, an LTE terminal of good propagation path quality is selected and assigned. Consequently, the scheduling section 302 allocates resource blocks that anticipate improved throughput, using the CQI of each resource block fed back from the LTE terminal.

Also, the scheduling section 302 controls the number of CCE aggregations in accordance with the conditions of the propagation path with the LTE terminal (or the MTC terminals). Also, the MCS (coding rate and modulation scheme) to fulfill a predetermined block error rate with the allocated resource blocks is determined. Parameters to fulfill the MCS (coding rate and modulation scheme) determined in the scheduling section 302 are set in channel coding sections 303 and 308 and modulation sections 304 and 309.

The baseband signal processing section 204 has channel coding sections 303, modulation sections 304, and mapping sections 305, to match the maximum number of users to multiplex, N. The channel coding sections 303 perform channel coding of the shared data channel (PDSCH), formed with user data (including part of higher control signals) that is output from the data generating sections 301, on a per user basis. The modulation sections 304 modulate the user data having been subjected to channel coding, on a per user basis. The mapping sections 305 map the modulated user data to radio resources.

Also, the baseband signal processing section 204 has a downlink control information generating section 306 that generates downlink shared data channel (PDSCH) control information which is terminal-specific downlink control information, a downlink shared channel control information generating section 307 that generates downlink shared control channel control information (common control information) that is shared between terminals, and an uplink control information generating section 311 that generates uplink control information to control an uplink shared data channel (PUSCH) on a per terminal basis. Also, channel coding sections 308 to execute channel coding of generated control information on a per terminal basis, and modulation sections 309 to modulate the control information having been subjected to channel coding, are provided.

The downlink control information generating section 306 generates downlink shared data channel control information (DL assignments and so on) for controlling the downlink shared data channel (PDSCH). This downlink shared data channel control information is generated on a per user basis.

The downlink shared channel control information generating section 307 generates the common control information to be shared between LTE terminals and/or MTC terminals. For example, the downlink shared channel control information generating section 307 generates common control signals for receiving the system information (for example, SIBs) allocated to the PDSCH upon the initial connection process of the LTE terminal and/or the MTC terminals.

The uplink control information generating section 311 generates uplink control information (for example, DCI format 0/4) from allocation information that represents the number of resource blocks and the positions of resource blocks determined per terminal, the modulation scheme, the coding rate, the redundancy version, identifiers (new data indicators) to identify between new data and reconstructed data, PUSCH transmission power control commands, cyclic shift for demodulation reference signals (CS for DMRS), CQI request, PMI/RI and so on.

The reference signal generating section 318 multiplexes cell-specific reference signals (CRSs) which are used for various purposes such as channel estimation, symbol synchronization, CQI measurement, mobility measurement and so on, in resource blocks (RBs) by FDM/TDM, and transmits these. Also, the reference signal generating section 318 transmits downlink demodulation reference signals (UE-specific RSs).

In the downlink/uplink control information modulated on a per terminal basis in the above modulation sections 309, the control information to be allocated to the conventional PDCCH is multiplexed in the control channel multiplexing section 314, and, furthermore, interleaved in the interleaving section 315. Meanwhile, the control information to be allocated to the extended PDCCHs is mapped to radio resources in the mapping section 312. The mapping section 312 maps common control signals which are common between LTE terminals and/or MTC terminals, to the common search space of the extended PDCCHs. Also, the mapping section 312 maps terminal-specific control signals to the UE-specific search spaces of the extended downlink control channels. Note that the mapping section 305 and the mapping 312 may be provided in common.

Control signals that are output from the interleaving section 315 and user data that is output from the mapping section 305 are input in an IFFT section 316 as downlink channel signals. Also, the downlink demodulation reference signals generated in the reference signal generating section 318 are input in the IFFT section 316.

The IFFT section 316 performs an inverse fast Fourier transform of the downlink channel signals and the downlink demodulation reference signals, and converts the frequency domain signals into a time domain signal. With the present embodiment, the transmission band of the MTC terminals is limited to a narrower band than the system band of the LTE terminal. Consequently, the sampling rate to be involved in the inverse fast Fourier transform can be made big compared to the LTE terminal, so that it is possible to reduce the load on the IFFT section 316. As a result, it is possible to reduce the cost of the IFFT section 316.

A cyclic prefix (CP) inserting section 317 inserts cyclic prefixes which function as guard intervals for cancelling the variabilities of multi-path propagation delay, in the time sequence signal of the downlink channel signals. The transmission data, to which cyclic prefixes have been added, is transmitted to the transmitting/receiving section 203.

Figure 11:
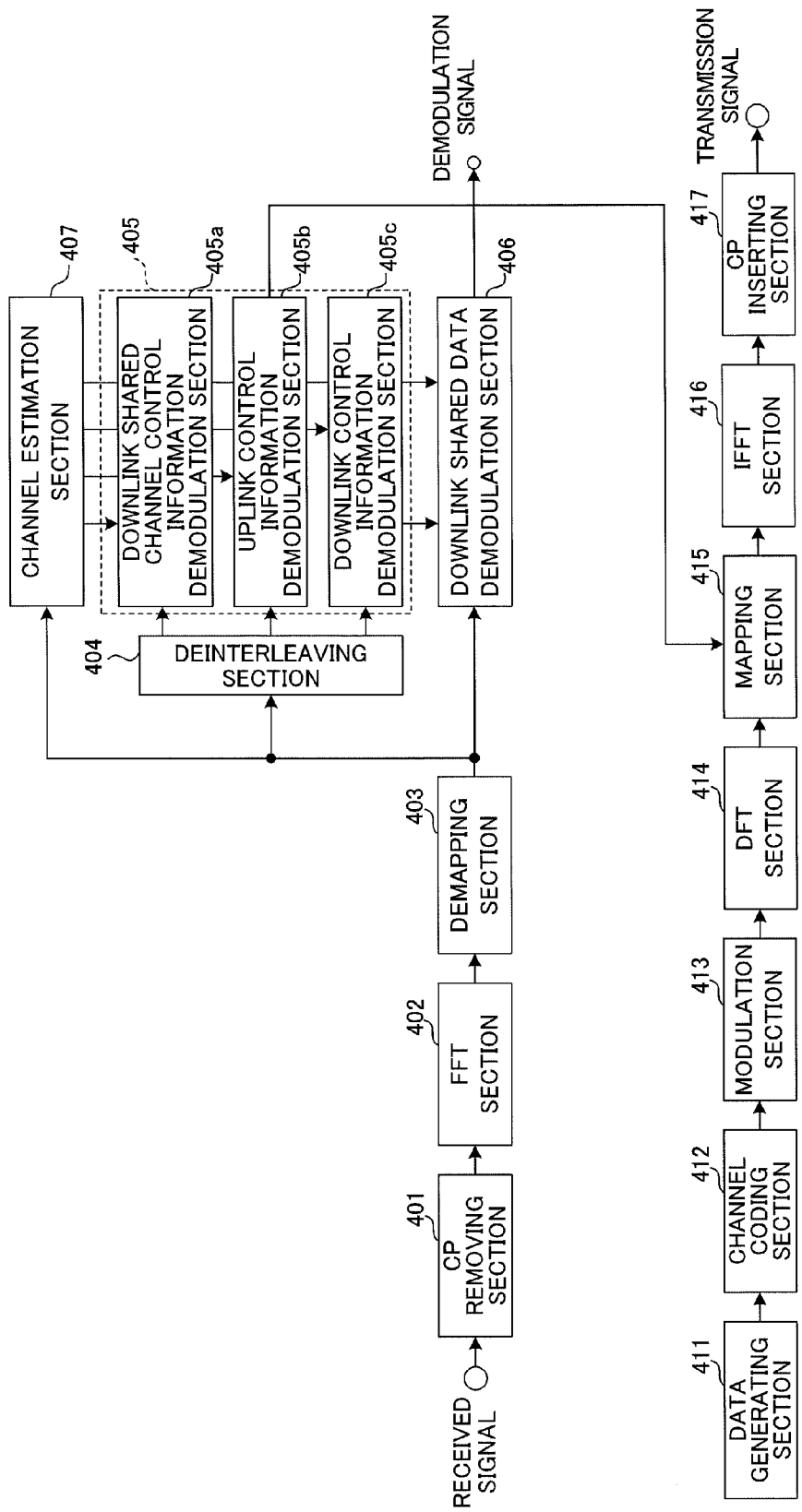
FIG. 11 is a block diagram to illustrate a configuration of a baseband processing section in a radio communication terminal according to the present embodiment.

FIG. 11 is a functional block diagram of a baseband signal processing section 104 provided in the MTC terminals and/or the LTE terminal. First, the downlink configuration will be described.

A downlink signal that is received as received data from the base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal to a demapping section 403. The demapping sections 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from the application section 105. The multiplex control information that is output from the demapping section 403 is deinterleaved in a deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 has a downlink shared channel control information demodulation section 405a that demodulates the downlink shared control channel control information, an uplink control information demodulation section 405b that demodulates the uplink control information, and a downlink control information demodulation section 405c that demodulates the downlink control information.

The downlink shared channel control information demodulation section 405a extracts the downlink shared control channel control information which is downlink control information shared by users, by performing a blind decoding process, a demodulation process, a channel decoding process and so on of the common search space of the extended PDCCHs. For example, upon the initial connection process of the MTC terminal, the downlink shared channel control information demodulation section 405a performs the blind decoding process of the common search space of extended PDCCHs arranged in predetermined frequency regions of the second frequency band, and decodes the common control information. The downlink shared data demodulation section 406 can receive the system information (for example, SIBs) and so on allocated to the PDSCHs, based on the common control information that is acquired.

The uplink control information demodulation section 405b extracts the user-specific uplink control information by performing a blind decoding process, a demodulation process, a channel decoding process and so on of the user-specific search spaces of the downlink control channels (extended PDCCHs). The extracted uplink control information is sent to the channel coding section 412, the mapping section 415 and so on, which will be described later.

The downlink control information demodulation section 405c extracts the downlink control information which is a user-specific downlink control signal, by performing a blind decoding process, a demodulation process, a channel decoding process and so on of the user-specific search spaces of the downlink control channels (extended PDCCHs). The demodulated downlink control information is input in the downlink shared data demodulation section 406, and used for the demodulation of the downlink shared data channel (PDSCH) and so on.

The downlink shared data demodulating section 406 demodulates the user data, higher control information, system information and so on, based on the downlink control information input from the downlink control information demodulation section 405c. The higher control information is output to a channel estimation section 407.

The channel estimation section 407 performs channel estimation using user terminal-specific reference signals or common reference signals. The estimated channel variation is output to the downlink shared channel control information demodulation section 405a, the uplink control information demodulation section 405b, the downlink control information demodulation section 405c and the downlink shared data demodulating section 406. In these demodulation sections, downlink allocation information is demodulated using the estimated channel variation and the demodulation reference signals.

Next, the uplink configuration will be described. The baseband signal processing section 104 has a data generating section 411, a channel coding section 412, a modulation section 413, a DFT section 414, a mapping section 415, an IFFT section 416, and an CP inserting section 417.

The data generating section 411 generates transmission data from bit data that is received as input from the application section 105. The channel coding section 412 applies a channel coding process such as error correction, to the transmission data, based on the coding rate reported by the MCS included in the uplink control information, and so on. The modulation section 413 modulates the transmission data having been subjected to channel coding by QPSK and so on, based on the modulation scheme that is reported by the MCS included in the uplink control information or by the modulation scheme that is fixed in advance.

The DFT section 414 performs a discrete Fourier transform on the modulated transmission data. With the present embodiment, the uplink transmission band of the MTC terminals is limited to a narrower band than the uplink system band for the LTE terminal. Consequently, the bandwidth to be involved in the discrete Fourier transform becomes small compared to the LTE terminal, so that it is possible to reduce the load upon the DFT section 414. As a result, it is possible to reduce the cost of the DFT section 414.

The mapping section 415 maps the transmission data after the DFT to designated radio resources. The IFFT section 416 converts input data corresponding to the system band, into time domain data through an inverse fast Fourier transform. The CP inserting section 417 inserts cyclic prefixes in the data after the inverse fast Fourier transform, in data units.

With the present embodiment, the transmission band for the MTC terminals is limited to a narrower band than the system band of the LTE terminal. Consequently, the sampling rate to be involved in the inverse fast Fourier transform can be made big compared to the LTE terminal, so that it is possible to reduce the load upon the IFFT section 416. As a result, it is possible to reduce the cost of the IFFT section 416.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-109764, filed on May 11, 2012, including the specification, drawings and abstract, is incorporated herein by reference in its entirety.

The invention claimed is:

1. A base station apparatus that communicates with a first type of communication terminal in a first frequency band and that communicates with a second type of communication terminal in a second frequency band that is a narrower bandwidth than the first frequency band and is arranged in the first frequency band, the base station apparatus comprising:
   an allocation control section that allocates extended downlink control channels which are frequency-division-multiplexed with downlink shared data channels, from a top of a subframe to a last symbol in the first frequency band and the second frequency band, and allocates at least two of the extended downlink control channels in a plurality of frequency regions in the second frequency band along a frequency axis direction; and a mapping section that maps common control signals that are common to the second type of communication terminal in common search spaces of the at least two of the extended downlink control channels arranged in the second frequency band so that the common control signals are distributed over the at least two of the extended downlink control channels, and maps common control signals that are common to the first type of communication terminal in common search space of extended downlink control channels arranged in the first frequency band apart from the at least two of the extended downlink control channels.

2. The base station apparatus according to claim 1, wherein the mapping section maps a signal relating to system information which is demodulated using one of the common control signals which are common to the second type of communication terminal, in one of the downlink shared data channels that is arranged in the second frequency band.

3. The base station apparatus according to claim 2, wherein the allocation control section allocates the at least two of the extended downlink control channels to both ends of the second frequency band along a frequency axis direction.

4. The base station apparatus according to claim 1, wherein the allocation control section allocates at least two of the extended downlink control channels to both ends of the second frequency band along a frequency axis direction.

5. The base station apparatus according to claim 1, further comprising:
a transmission section that reports positions where the at least two of the extended downlink control channels are arranged, to the second type of communication terminal by using broadcast information.

6. The base station apparatus according to claim 1, wherein the allocation control section allocates the extended downlink control channels apart from the at least two of the extended downlink control channels to both ends of the first frequency band along a frequency axis direction.

7. The base station apparatus according to claim 1, wherein:
the common control signals that are common to the first type of communication terminal are distributed in the extended downlink control channels apart from the at least two of the extended downlink control channels.

8. The base station apparatus according to claim 1, wherein when not transmitting downlink control information to the second type of communication terminal, the allocation control section allocates a downlink shared data channel for the first type of communication terminal in the second frequency band.

9. A radio communication terminal that communicates with a base station apparatus in a second frequency band of a narrower bandwidth than a first frequency band which the base station apparatus supports, wherein the second frequency band is arranged in the first frequency band, the radio communication terminal comprising:
a determining section that determines positions of extended downlink control channels that are frequency-division-multiplexed with downlink shared data channels and arranged, from a top of a subframe to a last symbol, in a plurality of frequency regions in the second frequency band along a frequency axis direction;

a receiving section receives common control information that is allocated to common search spaces of the extended downlink control channels so that the common control signals are distributed over the extended downlink control channels; and a demodulation section that demodulates system information that is allocated to the downlink shared data channels based on the common control information, wherein other extended downlink control channels are arranged from the top of the subframe to the last symbol in the first frequency band, and common control information for a first type of communication terminal different from the radio communication terminal is allocated in common search space of the other extended downlink control channels.

10. A radio communication system comprising a base station apparatus that communicates with a first type of communication terminal in a first frequency band and that communicates with a second type of communication terminal in a second frequency band that is a narrower bandwidth than the first frequency band and is arranged in the first frequency band, wherein
the base station apparatus includes:
an allocation control section that allocates extended downlink control channels which are frequency-division-multiplexed with downlink shared data channels, from a top of a subframe to a last symbol in the first frequency band and the second frequency band, and allocates at least two of the extended downlink control channels in a plurality of frequency regions in the second frequency band along a frequency axis direction; and a mapping section that maps common control signals that are common to the second type of communication terminal in common search spaces of the at least two of the extended downlink control channels arranged in the second frequency band so that the common control signals are distributed over the at least two of the extended downlink control channels, and maps common control signals that are common to the first type of communication terminal in common search space of extended downlink control channels arranged in the first frequency band apart from the at least two of the extended downlink control channels, and the second type of communication terminal includes:
a determining section that determines positions of the at least two of the extended downlink control channels;
a receiving section receives the common control signals that are allocated to the common search spaces of the at least two of the extended downlink control channels; and
a demodulation section that demodulates system information that is allocated to the downlink shared data channel based on the common control signals.

11. A radio communication method for a first type of communication terminal that supports a first frequency band, a second type of communication terminal that supports a second frequency band of a narrower bandwidth than the first frequency band and is arranged in the first frequency band, and a base station apparatus, the radio communication method comprising:
allocating, in the base station apparatus, extended downlink control channels which are frequency-division-multiplexed with downlink shared data channels, from the top of a subframe to a last symbol in first frequency band and the second frequency band, and allocating at least two of the extended downlink control channels in a plurality of frequency regions in the second frequency band along a frequency axis direction;

mapping, in the base station apparatus, common control signals that are common to the second type of communication terminal, in common search spaces of the at least two of the extended downlink control channels arranged in the second frequency band so that the common control signals are distributed over the at least two of the extended downlink control channels, and mapping common control signals that are common to the first type of communication terminal in common search space of extended downlink control can arranged in the first frequency band apart from the at least two of the extended downlink control channels;

determining, in the type of second communication terminal, positions of the at least two of the extended downlink control channels;

receiving, in the second type of communication terminal, the common control signals that are allocated to the common search spaces of the at least two of the extended downlink control channels; and demodulating, in the second type of communication terminal, system information that is allocated to the downlink shared data channel based on the common control signals.

\* \* \* \* \*